Feb. 9, 1937.  O. W. OLSEN  2,070,023
PROCESS OF EMBOSSING OR DECORATING CELLULOSIC PLASTICS
Filed Feb. 19, 1930
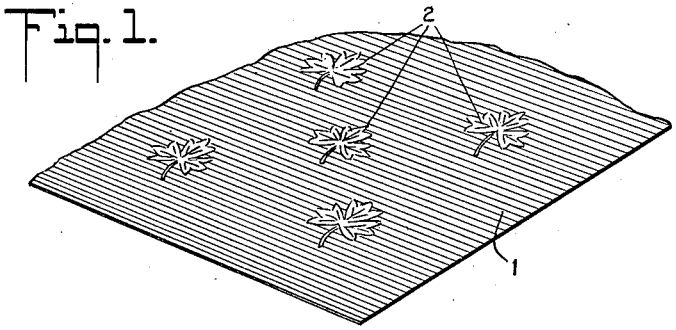
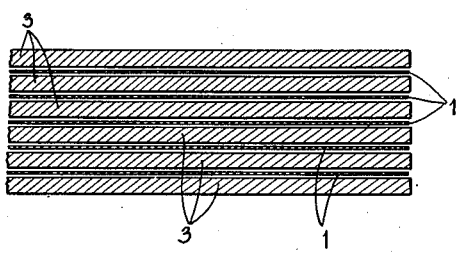
INVENTOR
Oscar W. Olsen
BY
ATTORNEYS Patented Feb. 9, 1937

2,070,023

UNITED STATES PATENT OFFICE 2,070,023

PROCESS OF EMBOSSING OR DECORATING CELLULOSIC PLASTICS

Oscar W. Olsen, Irvington, N. J., assignor to Celluloid Corporation, a corporation of New Jersey Application February 19, 1930, Serial No. 429,617

6 Claims. (Cl. 18—61)

This invention relates to a method of embossing or otherwise decorating the surface of articles made of or containing plastic compositions comprising derivatives of cellulose.

An object of my invention is to emboss or otherwise decorate articles made of thermoplastic compositions containing derivatives of cellulose in an economical manner. A further object of my invention is to emboss thermoplastic compositions of cellulose derivatives by employing relatively thin foils having the desired pattern thereon as an impressing medium. Other objects of my invention will appear from the following detailed description.

In the embossing of sheets of plastic materials containing derivatives of cellulose such as pyroxylin, the prior practice has involved the use of relatively heavy metal plates of a thickness of approximately ¼", upon the surface of which the desired design has been engraved. These engraved plates have been superposed upon the plastic sheets and heat and pressure applied, whereupon the thermoplastic material is caused to be embossed. However, these metal plates are very expensive to make, and because of their weight are awkward to handle. Often when the heavy plates are employed "skips" are obtained due to the failure of the plastic material to fill all the impressions of the stiff plate. Moreover, because of the thickness of these metal plates, only relatively few layers of plastic sheets and plates may be placed between the platens of the press. Moreover such metal plates tend to tarnish or rust and thus become useless, which is a serious consideration because of the great initial cost of the same.

I have made the surprising discovery that relatively thin metal foils having a suitable design thereon may be employed as the pressing medium for embossing or otherwise decorating articles made of thermoplastic compositions containing derivatives of cellulose. Contrary to what would be expected, these foils give perfectly satisfactory impressions or embossings, despite their relative thinness. The use of such thin foils for this purpose obviates the objections above described as accruing from the use of heavy plates.

In accordance with my invention I emboss or otherwise decorate the surface of articles made of or containing thermoplastic compositions comprising derivatives of cellulose by superposing a relatively thin metal foil having a suitable design impressed thereon and pressing under heat and pressure. The metal foil is then stripped or removed from the surface of the article, leaving the surface embossed or otherwise decorated.

Any suitable article having a surface of a thermoplastic composition containing the derivative of cellulose may be embossed or decorated by my process. The articles may be in the form of sheets, films, foils or relatively thick articles such as blocks or finished articles consisting wholly or in part of the cellulosic thermoplastic composition. If desired articles having an inner core of metal, wood, ceramics, the surface of which is coated with the cellulosic thermoplastic material may be treated in accordance with my invention.

The thermoplastic composition may contain any suitable derivative of cellulose such as cellulose nitrate (pyroxylin) or organic derivatives of cellulose. The organic derivative of cellulose may be an organic ester of cellulose or cellulose ether. Examples of organic esters of cellulose are cellulose acetate, cellulose formate, cellulose propionate and cellulose butyrate, while examples of cellulose ethers are ethyl cellulose, methyl cellulose and benzyl cellulose.

Besides the derivative of cellulose, the thermoplastic composition may contain softening agents or plasticizers, pigments, dyes, filling materials and/or stabilizers such as urea, as is well understood in the art. Examples of plasticizers are camphor, castor oil, diethyl phthalate, dibutyl phthalate, diethyl tartrate, etc., the choice of which depends on the particular derivative of cellulose employed and the particular use to which the thermoplastic composition is to be put.

As an impressing medium, I employ a relatively thin metal foil having a thickness of the order of 0.001 to 0.006", preferably about 0.003". While I prefer to use aluminum foil, the foil may be made of other metals such as zinc, tin, nickel, copper or alloys such as brass, duraluminum, etc. In general any metal or alloy may be employed provided it is not so soft as to smooth out or flatten under pressing conditions. On the whole I prefer aluminum, as it is strong, light, easily worked and the impressions thereon are not readily deformed.

The metal foil used as the impressing medium may be impressed with a desired design by passing the same between embossing rollers. This is one of the advantages of my invention, as the embossing of the foil may be done cheaply, and any number of foils may be impressed by the same embossing rolls.

The impressions made on the thermoplastic composition may be in relief or intaglio, in which case the impressing foil will have a design in the opposite sense.

A large number of layers of metal foil alternating with sheets or films of the plastic composition may be built up prior to pressing. The two faces of the foil may be thus used to make two impressions in one operation; i. e. upon the surfaces of the plastic sheets immediately above and immediately below the foil. Further to illustrate this feature, reference is had to the accompanying drawing, wherein Figure 1 is a perspective view of a part of the foil, and Figure 2 is a diagrammatic cross section showing how the foil and the plastic sheets may be built up.

Referring to the drawing, 1 indicates the metal foil having the desired designs 2 impressed thereon. As shown in Figure 2, the metal foils 1 are placed between the sheets 3 of the cellulosic thermoplastic composition.

The assembly of plastic sheets and foil is then placed in a press and subjected to the required pressure, say from less than 500 to more than 1200 lbs. per square inch, depending on the nature of the plastic material. The temperature employed corresponds generally to 5 to 25 lbs. per square inch steam pressure. After the required embossing has taken place, the assembly is removed from the press, and the foil is stripped from the plastic sheets.

As a specific example, the foils are placed flat between sheets made of a thermoplastic composition containing cellulose nitrate and camphor, and the assembly is pressed in a hydraulic press using about 10 lbs. per square inch of steam for 10 minutes and a pressure of about 800 lbs. per square inch. These conditions of course can be varied considerably depending upon the nature of the stock, etc. Plastics containing cellulose acetate, for example, generally soften more readily under heat, and therefore the temperatures and pressures above mentioned may be reduced. If desired the plastic sheets may be softened by treating with vapors of solvent, prior to the operation. Also if desired two or more sheets of the thermoplastic material may be caused to be united under the heat and pressure at the same time that the embossing operation is taking place.

The process of this invention involves many advantages. The thin foils employed are cheap and may be embossed in an economical manner. Because of their little weight, they may be handled very readily and require but little room both in storage and while in the press. Therefore more sheets of plastic material may be embossed in one operation, since but little of the space between the platens of the press is occupied by the foil. The metal foil is good for many operations on the order of 60 or more, and then may be sold as scrap or reworked into foil. Unlike stiff plates, the foil is soft and yields to conform with the surface of the sheets to be embossed thus avoiding "skips".

Sheets treated in accordance with this invention may be employed for making lamp shade sheet stock and for other purposes, and may be also employed for veneering wood, metal, paper, etc. If desired such sheets may be laminated on to the surface of articles made of plastic compositions containing derivatives of cellulose.

It is to be understood that the foregoing detailed description is given merely by way of illustration and that many variations may be made therein without departing from the spirit of my invention.

Having described my invention, what I claim and desire to secure by Letters Patent is:

1. The method of decorating the surface of an article comprising a thermoplastic material containing a derivative of cellulose comprising applying to the surface of the article comprising a thermoplastic material containing a derivative of cellulose a relatively thin metal sheet of a thickness of 0.001 to 0.006 inch having a design impressed thereon, and subjecting the same to pressure.

2. The method of decorating the surface of an article comprising a thermoplastic material containing a derivative of cellulose comprising applying to the surface of the article comprising a thermoplastic material containing a derivative of cellulose a relatively thin aluminum sheet of a thickness of 0.001 to 0.006 inch having a design impressed thereon, and subjecting the same to heat and pressure.

3. The method of decorating the surfaces of sheets of thermoplastic material containing a derivative of cellulose comprising interposing between said sheets of thermoplastic material containing a derivative of cellulose relatively thin metal foils of a thickness of 0.001 to 0.006 inch having a design embossed thereon, subjecting the assembly to heat and pressure, and then removing the foils.

4. The method of decorating the surfaces of sheets of thermoplastic material containing a derivative of cellulose comprising interposing between said sheets of thermoplastic material containing a derivative of cellulose relatively thin aluminum foils of a thickness of 0.001 to 0.006 inch having a design embossed thereon, subjecting the assembly to heat and pressure, and then removing the foils.

5. The method of decorating the surface of an article comprising a thermoplastic material, comprising applying to the surface of the article comprising a thermoplastic material a relatively thin aluminum sheet of a thickness of 0.001 to 0.006 inch having a design impressed thereon, and subjecting the same to heat and pressure.

6. The method of decorating the surfaces of sheets of a thermoplastic material comprising interposing between said sheets of a thermoplastic material relatively thin aluminum foils of a thickness of 0.001 to 0.006 inch having a design impressed thereon, subjecting the assembly to heat and pressure, and then removing the foils.

OSCAR W. OLSEN.